US010053629B2

(12) United States Patent
Wenzel (10) Patent No.: US 10,053,629 B2
(45) Date of Patent: Aug. 21, 2018

(54) METHODS FOR THE USE OF ULTRA-CLEAN CHAR

(71) Applicant: Saga Fuel Systems, Inc., Sparta, NJ (US)

(72) Inventor: Deborah Wenzel, Sparta, NJ (US)

(73) Assignee: Saga Fuel Systems, Inc., Sparta, NJ (US)

(*) Notice: Subject to any disclaimer, the term of this patent is extended or adjusted under 35 U.S.C. 154(b) by 0 days.

(21) Appl. No.: 15/688,625

(22) Filed: Aug. 28, 2017

(65) Prior Publication Data

US 2018/0057750 A1    Mar. 1, 2018

Related U.S. Application Data (60) Provisional application No. 62/385,737, filed on Sep. 9, 2016, provisional application No. 62/379,971, filed on Aug. 26, 2016.

(51) Int. Cl.
*C10B 53/07*    (2006.01)
*C10B 57/00*    (2006.01)

(52) U.S. Cl.
CPC .......... *C10B 53/07* (2013.01); *C10B 57/005* (2013.01)

(58) Field of Classification Search
CPC ......... C07C 1/0485; C07C 11/02; C07C 1/04; C01B 3/02; C10G 2400/02; C10G 2400/04; C10G 2400/08; C10G 2/32; C10L 1/1824
See application file for complete search history.

(56) References Cited

U.S. PATENT DOCUMENTS

| | | | |
|---|---|---|---|
| 4,153,514 A * | 5/1979 | Garrett | C10B 49/08 201/12 |
| 4,358,344 A | 11/1982 | Sass et al. | |
| 8,822,553 B1 * | 9/2014 | Wenzel | C01B 3/02 48/197 R |
| 9,334,796 B2 | 5/2016 | Wenzel | |
| 2004/0099095 A1 | 5/2004 | Minter | |
| 2011/0132737 A1 | 6/2011 | Jadhav | |

OTHER PUBLICATIONS

International Search Report and Written Opinion dated Nov. 9, 2017, for PCT/US2017/048944.
Barnes, A., "Ash Utilisation from Coal-Based Power Plants," Dec. 2004, Report No. COAL R274 DTI/Pub URN Apr. 1915; 25 pages.

* cited by examiner

*Primary Examiner* — Sharon Pregler
(74) *Attorney, Agent, or Firm* — David H. Jaffer; Pillsbury Winthrop Shaw Pittman LLP (57) ABSTRACT

Ultra-clean char is used to generate hydrocarbons and/or electricity in a clean environmentally friendly process. The ultra-clean char is produced by pyrolizing organic matter, such as coal or various organic waste. The pyrolyzed organic matter may be combusted in the presence of oxygen to produce heat, which can be used to generate electricity in a conventional boiler/generator system. Further, pyrolized organic matter can be combusted in the presence of carbon dioxide and further processed to produce various hydrocarbons. In other embodiments, the ultra-clean char may be subjected to an extraction process for capturing valuable rare earth elements.

14 Claims, 6 Drawing Sheets

METHODS FOR THE USE OF ULTRA-CLEAN CHAR

RELATED APPLICATIONS

This application claims priority from U.S. Provisional Patent Application Ser. No. 62/379,971 filed Aug. 26, 2016, and U.S. Provisional Patent Application Ser. No. 62/385,737 filed Sep. 9, 2016. The disclosures of each of these applications are incorporated herein by reference.

FIELD OF THE INVENTION

Embodiments of the present invention relate to pyrolizing carbon feedstocks to create ultra-clean char, and uses for such char.

BACKGROUND OF THE INVENTION

Current practices related to coal processing for heat and energy production perform at varying levels of efficiency and also produce unacceptable levels of noxious exhaust emissions. Efficiency levels can be adversely affected according to coal grade availability and unacceptable emissions from any coal grade include nitrogen oxides, sulfur oxides, gaseous mercury, soot and high levels of variously contaminated carbon dioxide.

The combination of these various inefficiencies associated with current coal industry practices has created such extreme conditions that many coal processing facilities have been forced to cease operating, a situation that has created many downstream negative affects including severe loss of industry revenue, loss of employment opportunities in not only coal processing industries but also mining operations, as well as an overall reduction in available energy resources both domestically and internationally. All of this occurring at a time when the combustion of raw coal to generate electricity is especially needed to supply the increasing demands of the global economy.

Another use for raw coal is the production of liquid hydrocarbon fuels using the Fischer-Tropsch coal-to-liquid fuel ("FTCTL") process, by which coal is converted from its raw state into liquid forms by breaking down the coal to a first product building block (carbon monoxide) through partial combustion in a low-oxygen atmosphere, followed by a series of catalytic reactions to convert the carbon monoxide with hydrogen to liquid hydrocarbons. The FTCTL process, however, is also only variously efficient depending on available coal grades and is known to produce unacceptable levels of exhaust emissions that include nitrogen oxides, sulfur oxides, gaseous mercury, soot, fine and less fine particulate matter, and high levels of variously contaminated carbon dioxide.

Current methods for coal processing have varying levels of heat efficiency produced by differing grades of mined coal. While anthracite and bituminous coal are now preferred as heat-producing feedstocks, lignite reserves are currently mined to a limited extent because heat value versus waste (solid, liquid and gaseous) is not sufficient to justify full-scale mining and use of lignite coal for heat and power generation.

A problem associated with current methods for coal processing is the industry's inability to make use of other feedstocks which could significantly increase the energy production yield from existing coal processing facilities. Other carbon-based feedstocks which could provide very high heat efficiency for energy production include landwaste, seawaste, industrial waste, plastics waste and petroleum coke ("pet coke"). Current practices in which raw feedstocks are combusted produce unacceptable levels of exhaust pollutants such as nitrogen oxides, sulfur oxides, gaseous mercury, soot, fine and less fine particulate matter, and variously contaminated carbon dioxide, which all require very expensive and variously insufficient post-combustion exhaust stream scrubbing and prohibitively expensive removal of other waste streams. Another problem associated with the possible use of land, sea, industrial, plastic waste and pet coke are the widely varying levels of heat available from the burning of these materials in their raw state.

Current methods for coal processing also have unpredictable levels of contamination of the final exhaust product, carbon dioxide. Even with current exhaust scrubbing mechanisms, contamination levels are often unacceptably high (especially nitrogen oxide levels) as is the expense associated with soot accumulation in scrubbing and/or catalytic conversion mechanisms. While there are potential uses for carbon dioxide which include sequestering and recently discovered methods for recirculating to produce liquid hydrocarbon fuel, any level of contamination in the final carbon dioxide exhaust stream impedes its reactivity level and resulting efficient use.

Yet another efficiency problem associated with current coal processes is the very low extraction rate of rare earth elements such as scandium, yttrium, lanthanum and cerium from slag and ash residue left following coal combustion. Current methods for extraction, at their very best, result in only about 2% extraction rate of rare earth elements from coal-derived ash and slag. Because there are important uses for these elements in the health care, transportation and electronics industries as well as military use, inefficient extraction processes involving ash and slag is a missed opportunity.

Prior art developments intended to improve coal process efficiency levels include fuel cell technologies designed to augment heat value from coal processes without increasing exhaust and waste streams. Post-combustion scrubbing technologies are continually being developed to improve scrubbing efficiency, especially pertaining to soot trapping and removal of excess soot from scrubbing and catalytic converter mechanisms. Coal gasification is another method intended to improve efficiency levels of heat production from coal while reducing exhaust pollutants. Other prior art methods for improving coal process efficiency involve developments in surfactant technologies which are used to extract rare earth elements from coal-derived post-combustion slag and ash.

Two prior art systems are described in U.S. Pat. Nos. 8,822,553 and 9,334,796 in which coal in the first patent, or any carbon-based material in the second patent, are converted to fuel through processes that first produce heat (and electricity according to the second patent) and carbon dioxide ($CO_2$). The carbon dioxide is then recirculated and reacted with carbon black or coke (C) to produce carbon monoxide (CO). The carbon monoxide resulting from the reaction of carbon dioxide and carbon black is then further reacted with hydrogen ($H_2$) produced by or from several possible reactions or sources to form liquid hydrocarbon fuel according to FTCTL practices.

Thus, the prior art describes systems by which coal or a carbon-based material can be used to produce fuel by first generating heat (and electricity) and carbon dioxide from the coal or carbon-based material and recirculating the carbon dioxide to react with carbon black to form carbon monoxide, which is then reacted with hydrogen to form liquid hydrocarbon fuels. These systems address the problem of excessive carbon dioxide emissions from the combustion of coal or a carbon-based material by converting the coal or carbon-based materials to fuel. While these processes address the problem of carbon dioxide exhaust as an undesirable final product from coal or carbon-based material processing, they are specifically linked to carbon dioxide recirculation and fuels production and do not address the many other problems associated with current coal processing methods described above.

SUMMARY OF THE INVENTION

The present invention introduces a shift from the prior art systems, through which a series of unexpected and dramatic improvements are possible. While it was understood that pyrolization of low-grade coal (and, later, any carbon-based material) was a preferred method for producing carbon black or coke (C) for later conversion to carbon monoxide (CO) and further reaction with hydrogen ($H_2$) to produce liquid hydrocarbon fuels, the prior art relies on combustion of coal (or another carbon-based material) to yield first products heat, electricity and carbon dioxide.

In the prior art two reactive systems are described: one by which carbon black is produced through pyrolization of coal or a carbon-based material, and the other by which heat, electricity and carbon dioxide are produced through combustion of coal or a carbon-based material. Separating the two functions in this way appeared to be the most efficient method for producing both the carbon black or coke needed for the overall system and for immediately accessing heat, electricity and carbon dioxide from the coal or other carbon-based materials.

The present invention obtains surprising results when all materials for all functions are first pyrolized and no materials are directly combusted in their raw state. At first it seemed this shift might require an unacceptable level of initially-required heat to accomplish pyrolization (which is significantly endothermic) for all carbon-based feedstock materials within the system, and would introduce an unproductive first step for those materials for which the intended first function was to actually yield heat, as well as electricity and carbon dioxide. It was discovered that the shift to pyrolizing all carbon-based feedstocks as a first step in the energy-production process would lead to multiple overall reactive improvements throughout successive steps in the entire system. Pyrolization of all feedstocks to produce a first product carbon black, coke, or "ultraclean char" (C) had the downstream effect of producing significant cumulative efficiency improvements, so that the revised system had value whether the system was used to produce liquid fuel as an end product or not.

The first improvement associated with the shift to pyrolizing all carbon-based feedstock materials as the first step in the energy-production system is that no differentiation is needed in determining which feedstock is used for which purpose. All carbon-based feedstocks are first pyrolized to produce ultra-clean char (carbon black, coke, C) whether the char is intended for combustion to produce heat, electricity and carbon dioxide ($CO_2$), or for reaction with carbon dioxide ($CO_2$) to produce carbon monoxide (CO) for further processing to yield liquid hydrocarbon fuels.

A second improvement associated with the shift to pyrolizing all carbon-based feedstock materials as the first step in the energy-production system is that all feedstocks may be either singularly processed (for instance bituminous coal by itself) or processed as a mixture (unseparated bituminous coal and lignite coal, for example) and still yield uniformly clean, uniform heat (BTU) yielding ultra-clean char. The uniformity of this ultra-clean char and the potential for non-differentiated feedstock use extends to all other carbon-based feedstock materials such as landwaste, seawaste, plastic waste, and industrial waste including petroleum coke or pet coke.

Another improvement associated with the shift to pyrolizing all carbon-based feedstock materials as the first step in the energy-production system is that all waste products are collected and processed before combustion, and are therefore processed as hydrogen- or nitrogen-bonded gaseous material, or as liquid or solid material for which there are many potential industrial uses, but never as a part of the post-combustion exhaust stream, thereby eliminating the need for exhaust stream scrubbing.

With the shift to pyrolizing all carbon-based feedstock materials as the first step in the energy-production system to produce ultra-clean char, the char has reduced impurities which might impede reactivity, will burn at ultra-efficiency to produce the best possible combustive heat from any and all carbon-based feedstocks and, when combusted in the presence of pure oxygen ($O_2$) will yield, not only super-efficient heat, but only ultra-clean carbon dioxide ($CO_2$). There is no soot in this combustion reaction.

In addition, with the shift to pyrolizing all carbon-based feedstock materials as the first step in the energy-production system, the slag and ash as the final product following ultra-clean char combustion will also be ultra-clean. That is not the only improvement. Pyrolization temperatures, which can range from 800°-1200° C. using standard electrical heat, to 2200° C. using induction heating methods and as high as 2400° C. using plasma heating methods, all will yield a more brittle, porous final product ash or slag. That brittle, more porous quality increases efficiency of rare earth element extraction. Whatever extraction methods are used, whether those currently in use (such as washing with non-ionic surfactants) or another method discovered or employed to improve the efficiency of the extraction processes, the pyrolization of the carbon-based material as the first step in the energy-production system further improves extraction efficiency.

DETAILED DESCRIPTION OF THE INVENTION

Definitions

The term "about" means plus or minus 10% of the numerical value of the number with which it is being used. Therefore, about 50% means in the range of 40%-60%.

"Ultra-clean" refers to a product being substantially free of impurities. For example, "ultra-clean char" is herein defined as a post-pyrolyzed organic material being substantially free of impurities. Further, "ultra-clean char" when discussed as resulting from a raw coal product is defined as a post-pyrolized coal product containing carbon, aluminum, silica and rare earth elements and being substantially free of impurities.

"Substantially free" is defined as being present in an amount of less than about 20% of the amount originally present. In one embodiment, the ultra-clean char has impurities present in an amount of less than about 15% of their original amounts. In one embodiment, the ultra-clean char has impurities present in an amount of less than about 10% of their original amounts. In one embodiment, the ultra-clean char has impurities present in an amount of less than about 5% of their original amounts. In one embodiment, the ultra-clean char has impurities present in an amount of less than about 2% of their original amounts. In one embodiment, the ultra-clean char has impurities present in an amount of less than about 1% of their original amounts. In one embodiment, the ultra-clean char has impurities present in an amount of less than about 0.5% of their original amounts. In one embodiment, the ultra-clean char has impurities present in an amount of less than about 0.2% of their original amounts.

"Pyrolized" and "pyrolysis" are defined as the thermochemical decomposition of an organic material at elevated temperatures in the absence of oxygen.

Figure 1:
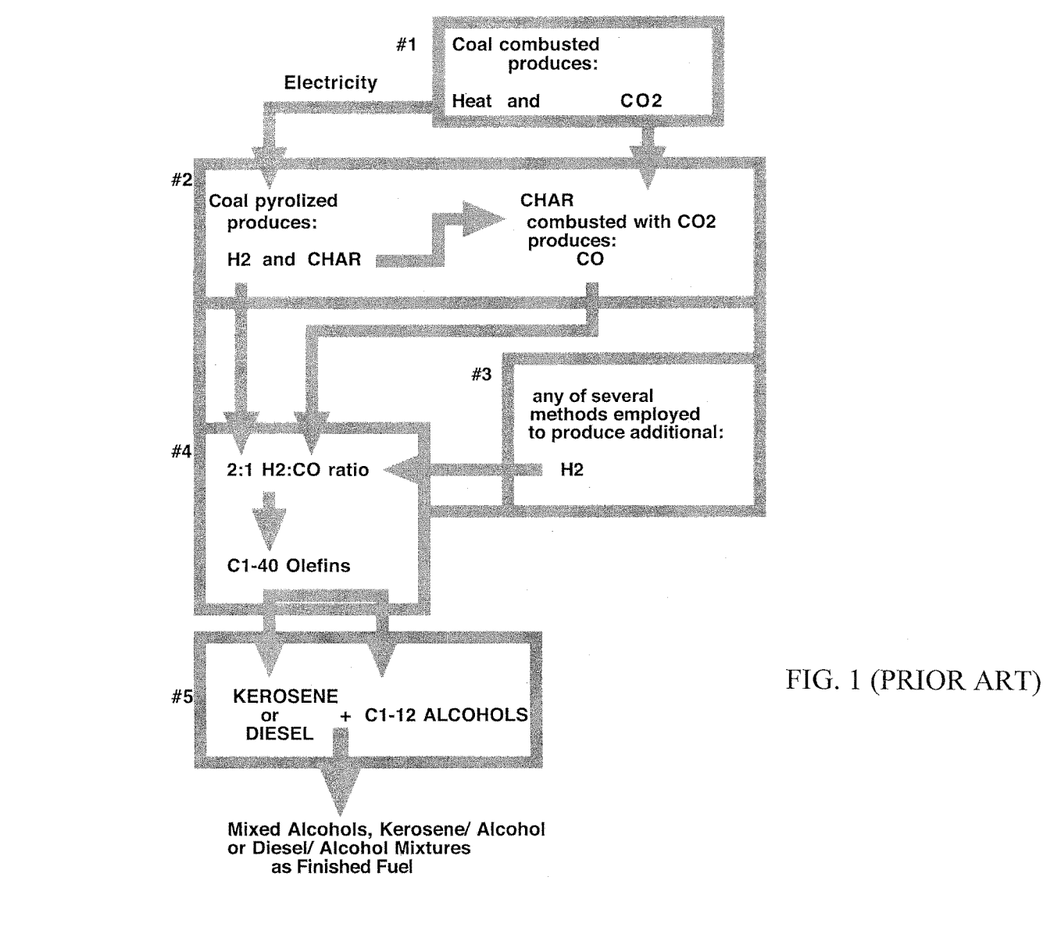
FIG. 1 illustrates the coal to liquid fuel process in U.S. Pat. No. 8,822,553 in which carbon dioxide is recirculated to react with carbon to produce carbon monoxide, which is further reacted with hydrogen to produce liquid hydrocarbon fuels.
Figure 2:
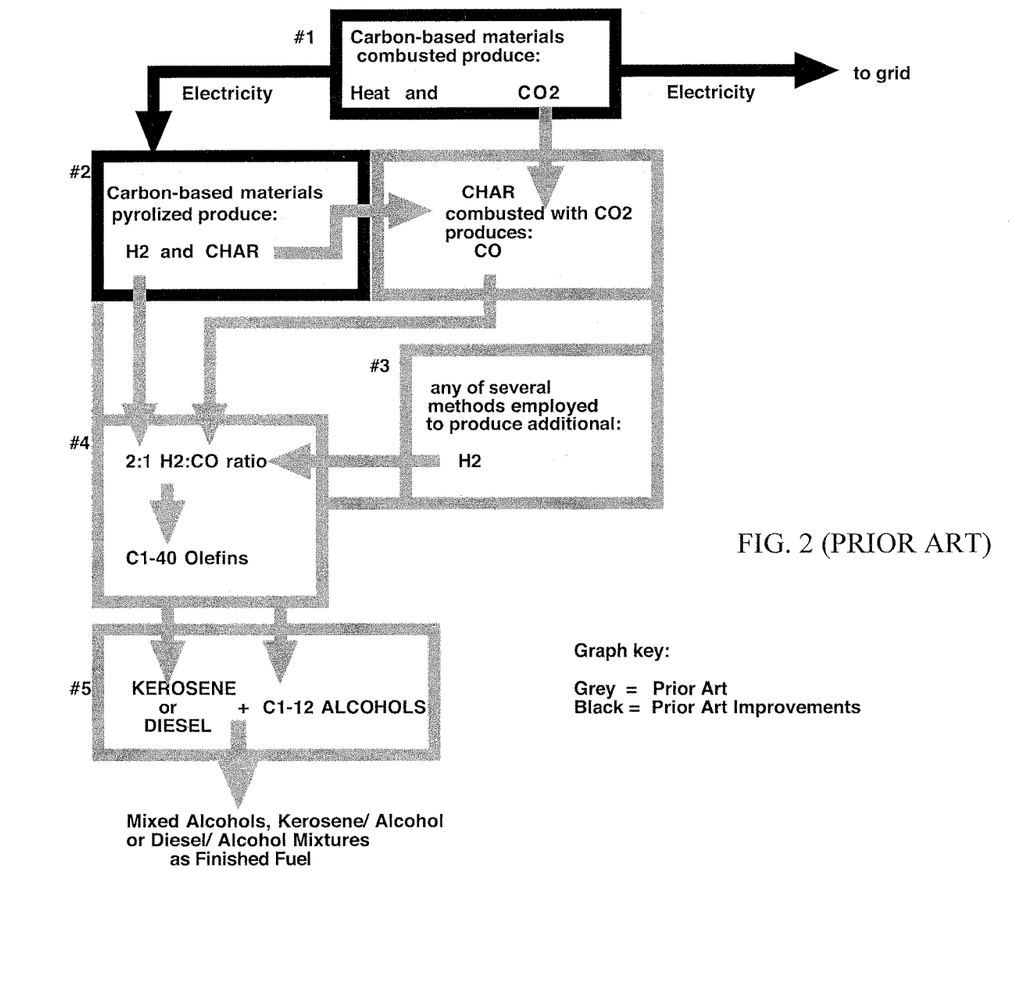
FIG. 2 illustrates the process of U.S. Pat. No. 9,334,796 in which any carbon-based material may be used as feedstock to produce liquid hydrocarbon fuels and generate electricity.

FIGS. 1 and 2 illustrate prior art processes in which the first step is combustion to generate heat and electricity to power the system and create carbon dioxide.

Figure 3:
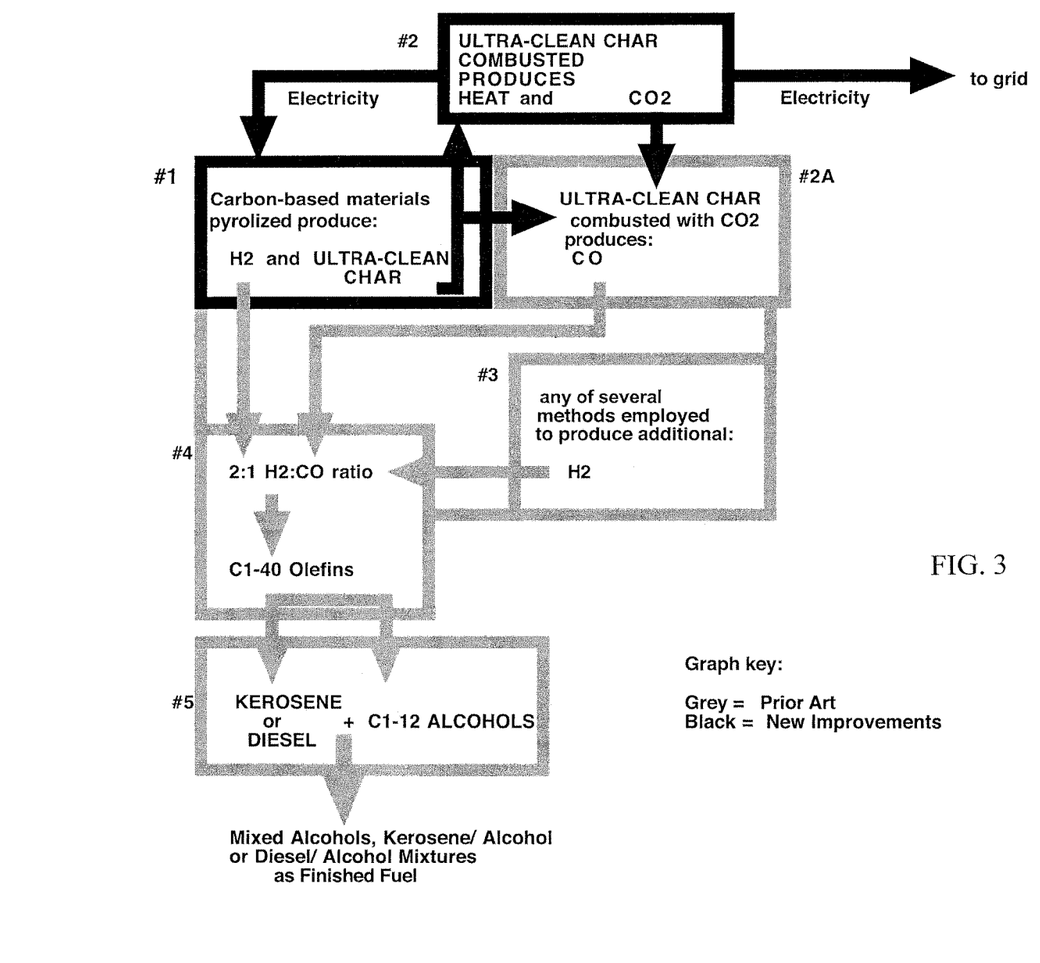
FIG. 3 illustrates the present invention in which all carbon-based materials are pyrolized to form ultra-clean char, or coke, as the first product; no material is combusted in its raw state; and the ultra-clean char, or coke, may be combusted to form heat and/or electricity, or reacted with carbon dioxide to form carbon monoxide which is further processed to yield liquid hydrocarbon fuels.

FIG. 3 illustrates the present invention in which all carbon-based materials are first pyrolized and no materials are combusted in their raw state. In this embodiment, Step 1 and Step 2 of the prior art systems are reversed so that Step 1 involves the pyrolization of any carbon-based material to yield first products hydrogen and carbon, or ultra-clean char, where the hydrogen is used in further downstream reactions and a portion of the carbon or ultra-clean char is combusted in Step 2 to produce heat and electricity sufficient to power the overall system as well as electricity for export to the grid or for other uses, as well as second product carbon dioxide. Step 2A involves the combustion of a portion of the first product carbon or ultra-clean char with recirculated second product carbon dioxide to yield third product carbon monoxide. Steps 3, 4, and 5 use prior art processes to generate hydrocarbon products.

Figure 4:
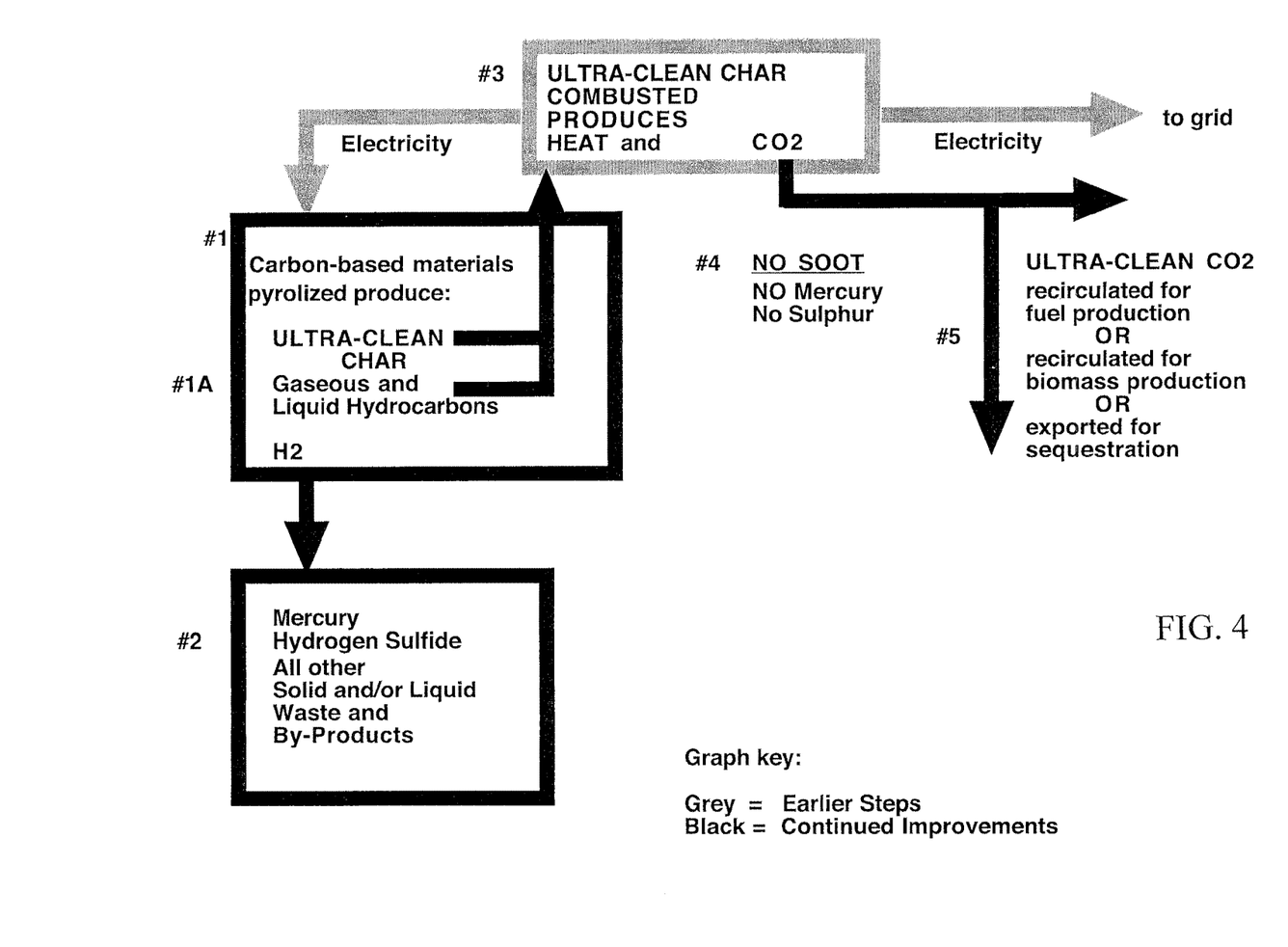
FIG. 4 is illustrates improvements resulting from the shift to pyrolization by which gaseous and liquid hydrocarbons resulting from pyrolization may be used to augment heat and/or electricity production; impurities are removed as liquid or solid by-products or waste following or during pyrolization; the resultant ultra-clean char, or coke, is combusted with the result that reduced soot, mercury, nitrogen, and sulfur are present in the post-combustion exhaust stream; and ultra-clean carbon dioxide may be exhausted into the atmosphere, recirculated for fuel or biomass production, and/or sequestered.

FIG. 4 illustrates improvements of the present invention made possible by pyrolization of all carbon-based materials as Step 1. Step 1A shows the redirection of first products gaseous and liquid hydrocarbons resulting from pyrolization for combustion to augment heat for the production of electricity and carbon dioxide. Step 2 shows the improvement of removal of impurities during or following pyrolization and prior to combustion. Step 3 describes combustion of ultra-clean char and redirected gaseous and liquid hydrocarbons to yield uniform heat and ultra-clean carbon dioxide. Step 4 shows the absence of soot, mercury or sulfur from the post-combustion exhaust stream, reducing the need to scrub or clean gaseous exhaust. Step 5 describes expanded possibilities for useful recirculation, absorption, or sequestering of all or portions of ultra-clean carbon dioxide.

Figure 5:
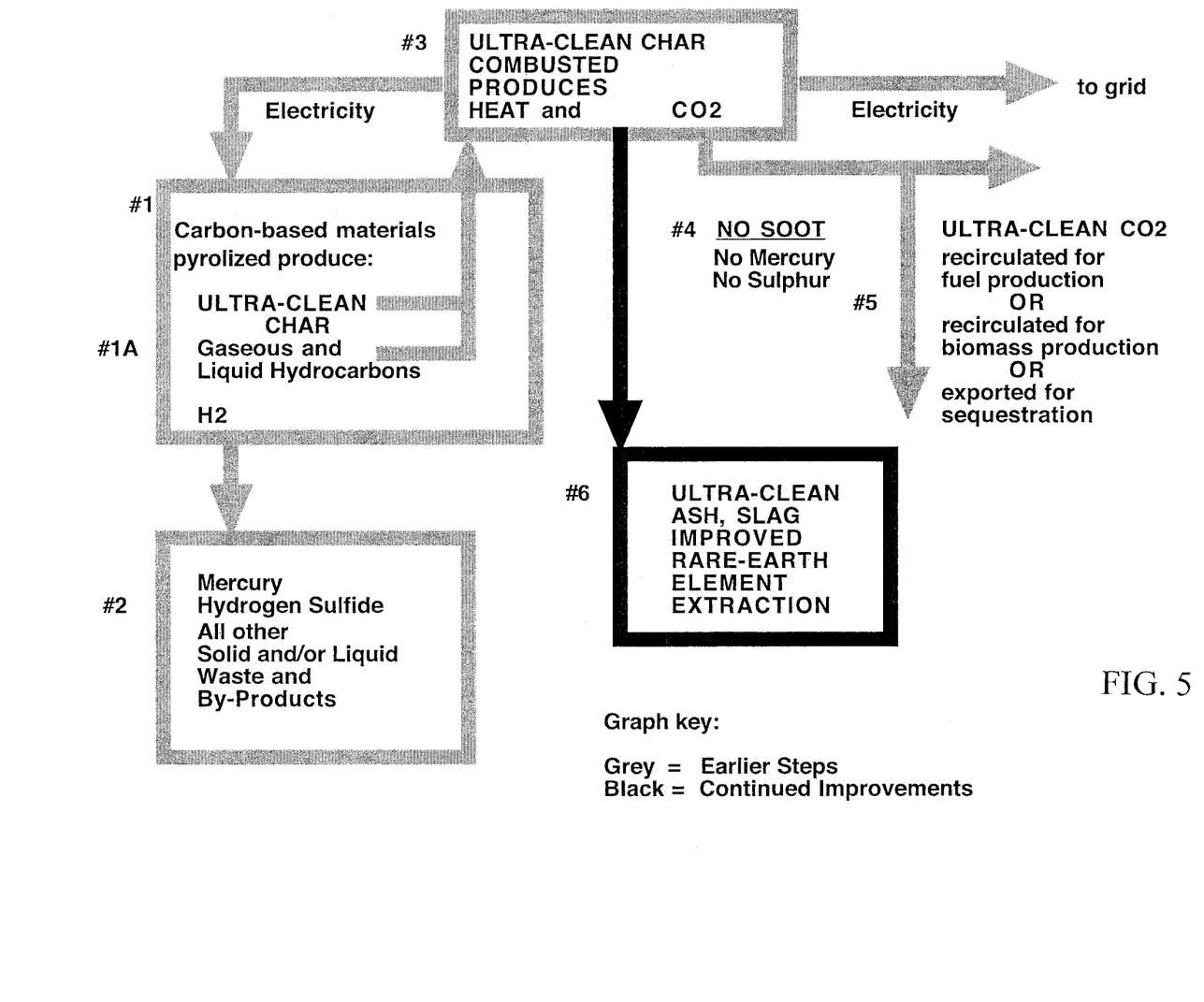
FIG. 5 illustrates further improvements resulting from the shift to pyrolization by which ultra-clean ash and slag are by-products resulting from the combustion of ultra-clean char, or coke, and rare earth element extraction is improved compared to rare earth element extraction from ash and slag produced from the combustion of raw coal or other carbon-based material combusted in its raw state.

FIG. 5 illustrates the further improvement of the present invention made possible by pyrolization of all carbon-based materials as Step 1, While the improvements described in Steps 2, 3, 4, and 5 remain intact, additional Step 6 shows final products ultra-clean ash and slag which allow for improved extraction of rare earth elements, as well as expanded possibilities for the re-use or recycling of ash or slag containing no impurities.

Figure 6:
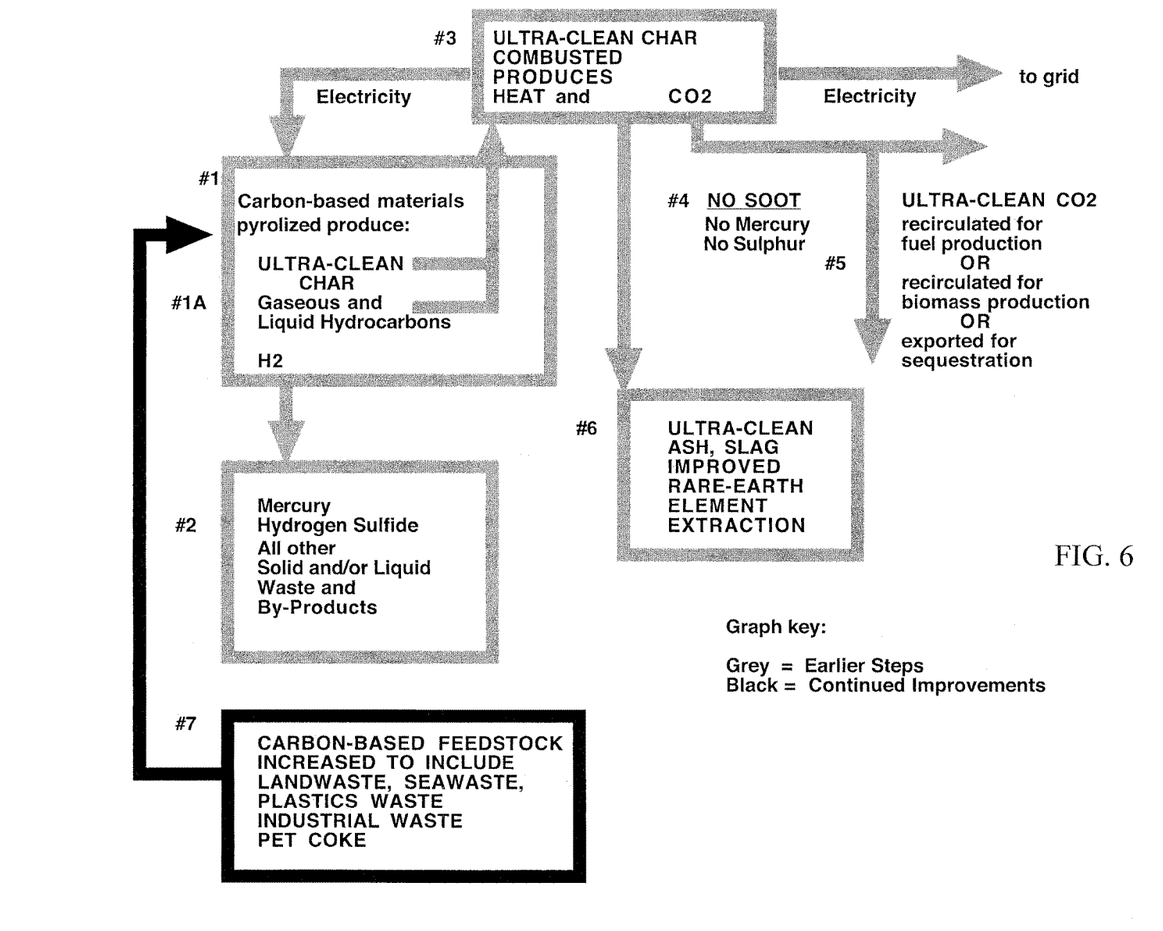
FIG. 6 illustrates further improvements resulting from the shift to pyrolization by which usable carbon-based feedstocks are expanded to include landwaste, seawaste, plastics waste, industrial waste and petroleum coke which otherwise could not be usefully employed as heat-producing sources because of unsatisfactory post-combustion exhaust streams when combusted in their raw state.

FIG. 6 illustrates another improvement of the present invention made possible by pyrolization of all carbon-based materials as Step 1. While the improvements described in Steps 2, 3, 4, 5 and 6 remain intact, additional Step 7 shows the expanded possibilities for use of many different types of raw material feedstocks including landwaste, sea waste, plastics waste, industrial waste and residual materials from the petroleum industry, such as petroleum coke. All these carbon-based feedstocks may be harvested, dried and pelletized to uniform size comparable to standard coal feedstock specifications.

The carbon-based feedstock is pyrolized, or reacted in a zero oxygen atmosphere, at temperatures that range from about 800° C. to 1500° C. using electricity as the heat-producing source, or from about 1500° C. to 2200° C. using induction heat, or from about 1800° C.-2400° C. using plasma heating technologies. In general, higher temperatures are preferred for extraction of impurities, but these may be optimized with cost considerations for the cost of the heating vessel and energy consumption. In addition, carbon materials containing lower levels of impurities, or in which the impurities are volatile at lower temperatures, may not require higher pyrolization temperatures. Mercury, sulfur, nitrogen, and all other impurities may be removed in their gaseous, liquid or solid states, leaving an ultra-clean pure carbon, or "char". The resultant ultra-clean char, following pyrolization of any grade carbon-based feedstock material, yields uniform and highly-efficient heat values when combusted. Such uniformity is highly desirable in industrial processes.

In addition, the liquid and gaseous hydrocarbons resulting from pyrolization of the carbon-based feedstock material may be recirculated and combusted for heat and/or electricity production. Sulfur may be combined with hydrogen during pyrolization to form hydrogen sulfide, which is then further reacted according to methods known in the art to form sulfuric acid or other compounds for industrial use. In addition, a resultant first product from pyrolization is ultra-clean char, which may be combusted in the presence of pure oxygen to form heat and a gaseous exhaust of pure carbon dioxide, free of impurities such as mercury, sulfur, nitrogen, or soot and reducing the need for post-combustion scrubbing. Further, all or a portion of the gaseous exhaust stream of pure carbon dioxide may be recirculated and combusted with pure ultra-clean char to form carbon monoxide, which is then reacted with hydrogen to produce liquid hydrocarbon fuels. Moreover, all or a portion of the gaseous exhaust stream of pure carbon dioxide may be recirculated for absorption through biomass production processes to form algae or other biomass products and oxygen. All or a portion of the gaseous exhaust stream of pure carbon dioxide may be captured and redirected for sequestration by methods and for purposes known in the art. If a portion of the gaseous exhaust stream of pure carbon dioxide is exhausted into the atmosphere, the portion re-directed for other uses as described above reduces the overall exhaustion of carbon dioxide into the atmosphere.

In another embodiment of the invention, post-combustion final products slag and ash are "ultra-clean" with reduced impurities that otherwise impede efficient extraction of rare earth elements, thereby improving efficiency of extraction methods, such as solvent, surfactant and non-ionic surfactant technologies. The final post-combustion products slag and ash are more porous and more brittle than slag and ash from standard raw coal combustion processes. They are more receptive to and respond more efficiently to rare earth element extraction methods.

Using the process of the present invention, unwanted by-products formed during the pyrolization of carbon-based materials can be easily captured and recirculated, or captured and recycled, or collected and reformed, or re-used for industrial processes, or sequestered. Removing these by-products results in an ultra-clean char that may be combusted with reduced environmental impact. Further, these by-products are more easily removed during or following pyrolization than during or following combustion, thereby creating a more environmentally friendly combustible material.

The carbon containing material used in the present invention may include various classifications of coal including anthracite, bituminous and lignite coal grades; organic waste, such as land waste, sea waste, industrial waste, plastic waste and the like. The pyrolization of organic waste provides a convenient outlet for waste disposal while providing a combustible fuel material, which can be used in a conventional boiler/generator system for generating electricity or other systems known in the art.

Combustion of Ultra-Clean Char

Ultra-clean char can be combusted in the presence of oxygen to produce heat and carbon dioxide. The heat from combustion of the ultra-clean char can be converted into electricity in a conventional boiler/generator system. Combusted ultra-clean char can generate an ultra-clean ash suitable for use in an extraction process for rare earth elements. The ultra-clean char may be combusted in an integrated system to generate ultra-clean ash and heat, which is converted into electricity through a conventional boiler/generator system, and the post-combusted ultra-clean ash may be subsequently processed for the extraction of rare earth elements. Combustion of ultra-clean char in the presence of oxygen produces a by-product of ultra-clean carbon dioxide. The ultra-clean carbon dioxide may be sequestered and used in a carbon dioxide-rich combustion of ultra-clean char in a process for converting the ultra-clean char into liquid hydrocarbons and olefins. Combusting the ultra-clean char results in very little post-processing clean-up. For example, after completion of the combustion, the clean-up includes very little if any scrubbing and/or filtering. Further, reduced levels of gaseous mercury, soot or sulfur oxides are formed during combustion of the ultra-clean char. Thus, the ultra-clean char results in a very efficient combustion fuel having very little post-processing clean-up as compared to the combustion of raw coal.

Extraction of Rare Earth Elements From Ultra-Clean Ash

Ultra-clean char may be produced from the pyrolization of a raw coal product, which is further combusted in the presence of oxygen to produce heat, carbon dioxide and ultra-clean ash. The ultra-clean ash can be further processed to extract rare earth elements that are contained therein. It is known that the rare earth elements adhere to the surface of molecules found in raw coal products, and current extraction techniques result in a rare earth element extraction of about 2 percent by weight. In one embodiment, rare earth elements are extracted from an ultra-clean char coal product at greater than 2 percent by weight. The ultra-clean ash produced by processes disclosed herein is more brittle than ash resulting from the combustion of raw coal. This increase in brittleness results in the ultra-clean ash having a higher surface area when pulverized as compared to a raw coal ash. This higher surface area exposes more surface sites in the ultra-clean ash where the rare earth elements are adhering to the molecules, and provides a more suitable product for the extraction of rare earth elements. The higher surface area provides for a higher yield of the rare earth elements from the ultra-clean ash over the post-combustion product of a raw coal counterpart. Common techniques used in the art may be employed for the extraction of the rare earth elements from the ultra-clean ash. Such techniques include one or more of a solvent extraction method and an ion-exchange method. In one embodiment, ammonium sulfate is used to extract rare earth elements from the ultra-clean ash. In another embodiment, ion exchange methods are employed. After extracting rare earth elements from the ultra-clean ash, the spent ash product can be disposed of or recycled as commonly known in the art.

Production of Liquid Hydrocarbons and Olefins

In another embodiment, the ultra-clean char can be used in an integrated system for conversion to liquid hydrocarbons, such as various hydrocarbons, olefins, fuels, alcohols, greases, waxes, and the like. Such a conversion is discussed in U.S. Pat. No. 8,822,553 and U.S. Pat. No. 9,334,796, which are incorporated herein by reference. While it is understood in the art that carbon dioxide, considered to be a detrimental exhaust by-product from coal processing, can be beneficially recirculated to form liquid hydrocarbon fuels, many other important waste stream problems involved with coal processing are currently inefficiently or insufficiently resolved. Some of the unresolved problems associated with coal processing include unacceptable levels of mercury, soot and sulfur in post-combustion exhaust streams, varying levels of carbon dioxide, contamination in post-combustion exhaust scrubbing mechanisms, widely varying levels of combustion efficiency from differing grades of coal or other carbon-based feedstocks, and inefficient extraction methods for waste stream by-products including but not limited to rare earth elements and other heavy metals. The present invention provides a novel system by which multiple pre- and post-combustion waste stream problems are resolved, uniformity of heat value is made available from all carbon-based feedstocks, combustion processes perform at maximum efficiency, post-combustion exhaust streams require no scrubbing and contain no soot, and pre- and post- combustion extraction methods for usable materials including rare earth elements and other heavy metals are improved. Through the introduction of a novel shift in processing steps, namely the pyrolization of all carbon-based feedstock materials as first process step, before combustion of the feedstock material, multiple downstream reaction improvements are made possible. Some of these improvements include expansion of usable feedstocks to include any carbon-based material, the removal of waste stream materials before, during or immediately following pyrolization so that reduced impurities or waste material are present during the combustion phase of processing.

While the present disclosure has been illustrated by the description of exemplary embodiments thereof, and while the embodiments have been described in certain detail, it is not the intention of this disclosure to restrict or in any way limit the scope of the appended claims to such detail. Additional advantages and modifications will appear to those skilled in the art. Therefore, the disclosure in its broader aspects is not limited to any of the specific details, representative devices and methods, and/or illustrative examples shown and described. Accordingly, departures may be made from such details without departing from the spirit or scope of this disclosure's general inventive concept.

What is claimed is:

1. A method for creating and using an ultra-clean char, comprising the steps of:
    (a) pyrolizing a carbon-based material at a temperature greater than 800° C. to produce an ultra-clean char, wherein the ultra-clean char is substantially free of at least one of an impurity selected from the group consisting of mercury, sulfur and nitrogen present in the carbon-based material prior to pyrolization;
    (b) capturing hydrogen from the pyrolization for use in downstream processes; and
    (c) combusting the ultra-clean char to produce energy used for the pyrolization.

2. The method of claim 1, wherein the ultra-clean char contains less than 5% of the impurity present in the carbon-based material prior to pyrolization.

3. The method of claim 1, wherein the ultra-clean char contains less than 1% of the impurity present in the carbon-based material prior to pyrolization.

4. The method of claim 1, further comprising the steps of:
    (a) capturing ultra-clean carbon dioxide from the combustion of the ultra-clean char; and
    (b) redirecting the ultra-clean carbon dioxide for use in a process selected from the group consisting of organic fuel production, biomass production, and sequestration.

5. The method of claim 1, wherein the pyrolization is at temperatures greater than 1000° C.

6. The method of claim 5, wherein the pyrolization is at temperatures between 1000° C. and 1500° C.

7. The method of claim 1, further comprising the steps of:
    (a) pulverizing the ultra-clean ash produced from the combustion of ultra-clean char; and
    (b) extracting rare earth elements from the ultra-clean ash.

8. The method of claim 4, further comprising the steps of:
    (a) pulverizing the ultra-clean ash produced from the combustion of ultra-clean char; and
    (b) extracting rare earth elements from the ultra-clean ash.

9. The method of claim 4, wherein the ultra-clean char contains less than 5% of the impurity present in the carbon-based material prior to pyrolization.

10. The method of claim 7, wherein the ultra-clean char contains less than 5% of the impurity present in the carbon-based material prior to pyrolization.

11. The method of claim 4, wherein the pyrolization is at temperatures greater than 1000° C.

12. The method of claim 8, wherein the pyrolization is at temperatures greater than 1000° C.

13. The method of claim 9, wherein the pyrolization is at temperatures greater than 1000° C.

14. The method of claim 1, wherein the carbon-based material is selected from the group consisting of coal, land waste, sea waste, plastics, industrial waste, and petroleum coke.

* * * * *